US010796049B1

United States Patent
Han et al.

(10) Patent No.: US 10,796,049 B1
(45) Date of Patent: Oct. 6, 2020

(54) WAVEFORM PROPAGATION TIMING MODELING FOR CIRCUIT DESIGN

(71) Applicant: Cadence Design Systems, Inc., San Jose, CA (US)

(72) Inventors: Kwangsoo Han, Austin, TX (US); Zhuo Li, Austin, TX (US); Charles Jay Alpert, Cedar Park, TX (US)

(73) Assignee: Cadence Design Systems, Inc., San Jose, CA (US)

( * ) Notice: Subject to any disclaimer, the term of this patent is extended or adjusted under 35 U.S.C. 154(b) by 43 days.

(21) Appl. No.: 16/228,481

(22) Filed: Dec. 20, 2018

(51) Int. Cl.
*G06F 17/50* (2006.01)
*G06F 30/3312* (2020.01)
*G06F 30/337* (2020.01)
*G06F 111/10* (2020.01)
*G06F 119/12* (2020.01)
*G06F 30/30* (2020.01)

(52) U.S. Cl.
CPC ........ *G06F 30/3312* (2020.01); *G06F 30/337* (2020.01); *G06F 30/30* (2020.01); *G06F 2111/10* (2020.01); *G06F 2119/12* (2020.01)

(58) Field of Classification Search
None
See application file for complete search history.

(56) References Cited

U.S. PATENT DOCUMENTS

| | | | | |
|---|---|---|---|---|
| 5,841,672 A * | 11/1998 | Spyrou | ................... | G06F 30/33 716/113 |
| 7,552,040 B2 * | 6/2009 | Dorfman | ............... | G06F 30/367 703/13 |
| 7,600,206 B2 * | 10/2009 | Lai | ......................... | G06F 30/367 716/113 |
| 8,020,129 B2 * | 9/2011 | Abbaspour | ......... | G06F 30/3312 716/113 |
| 8,504,956 B1 * | 8/2013 | Shebaita | ............. | G06F 30/3312 716/108 |
| 8,601,420 B1 * | 12/2013 | Keller | ..................... | G06F 30/00 716/113 |
| 9,507,903 B2 * | 11/2016 | Li | ........................... | G06F 30/20 |

(Continued)

OTHER PUBLICATIONS

L. T. Pillage et al., "Asymptotic Waveform Evaluation for Timing Analysis," IEEE Trans. on Computer-Aided Design, vol. 9, No. 4, Apr. 1990, pp. 352-366. (Year: 1990).*

(Continued)

*Primary Examiner* — Leigh M Garbowski
(74) *Attorney, Agent, or Firm* — Schwegman Lundberg & Woessner, P.A.

(57) ABSTRACT

Electronic design automation systems, methods, and media are presented for a waveform propagation timing model for use with circuit designs and electronic design automation (EDA). One embodiment involves generating a gate output waveform for a circuit element using a driver input signal waveform and then generating a circuit element output waveform using the gate output waveform and an N-pole model of an interconnect with the first circuit element using moment matching. Timing values are then determined from the circuit element output waveform, such as delay and slew values. This waveform may then be propagated through the circuit, and an updated design generated using the timing values estimated from the modeled waveforms.

20 Claims, 7 Drawing Sheets

(56) References Cited

U.S. PATENT DOCUMENTS

| | | | |
|---|---|---|---|
| 9,727,676 B1* | 8/2017 | Saurabh | G06F 30/3312 |
| 9,959,382 B2* | 5/2018 | Foreman | G06F 30/398 |
| 10,394,986 B2* | 8/2019 | Allen | G06F 30/367 |

OTHER PUBLICATIONS

C. J. Alpert et al., "RC Delay Metrics for Performance Optimization," IEEE Trans. on Computer-Aided Design of Integrated Circuits and Systems, vol. 20, No. 5, May 2001, pp. 571-582. (Year: 2001).*

K. Agarwal et al., "A Simple Metric for Slew Rate of RC Circuits Based on Two Circuit Moments," IEEE Trans. on Computer-Aided Design of Integrated Circuits and Systems, vol. 23, No. 9, Sep. 2004, pp. 1346-1354. (Year: 2004).*

C. J. Alpert et al., "Closed-Form Delay and Slew Metrics Made Easy," IEEE Trans. on Computer-Aided Design of Integrated Circuits and Systems, vol. 23, No. 12, pp. 1661-1669. (Year: 2004).*

* cited by examiner

WAVEFORM PROPAGATION TIMING MODELING FOR CIRCUIT DESIGN

TECHNICAL FIELD

Embodiments described herein relate to electronic design automation (EDA), and to systems, methods, devices, and instructions to analyze a circuit as part of design, verification, and generation of circuit designs.

BACKGROUND

Electronic design automation (EDA) is a category of systems for assisting with the design of electronic systems and devices. Large, integrated circuit designs are often assembled from previously designed blocks or generic designs which may include various combinations of elements. This enables reduced turnaround times for generation of an integrated circuit. Schematic and layout information for such block portions of a design may be exchanged or licensed as intellectual property. During design of a specific circuit, large numbers of combinations of different variables that go into a design may require significant resources to verify that all acceptable combinations will function properly.

BRIEF DESCRIPTION OF THE DRAWINGS

Various ones of the appended drawings merely illustrate example embodiments of the present disclosure and should not be considered as limiting its scope.

DETAILED DESCRIPTION

Embodiments described herein relate to EDA and to methods, computer media, and devices used for analyzing, optimizing, and creating electronic circuits. One of the many complex elements of circuit design is the timing analysis and modeling of signals propagating through the system. In addition to basic timing analysis related to the time that it takes signals to propagate along routing paths and through circuit elements, the shape of the signal may also be modeled, including information about the rise and fall of the waveform as it transitions between states. Slew is a change in voltage over time for such transitions, and models described herein may deal with the slew of a signal as it passes through a circuit design as well as the timing delay. Multiple different methods exist for such analysis, but such methods are either accurate but slow, or fast but inaccurate. Analytic delay and slew models, for example, are fast but inaccurate. Chip-level simulation, by contrast, is accurate, but very slow.

Embodiments described herein provide improved computing device performance during EDA operations by providing improved accuracy compared to analytical methods and improved speed compared to chip-level simulation. Such accurate and fast delay calculations provide significant improvements for clock tree and data path optimization to achieve better quality of results for a circuit design with reduced processing time. For example, if delay calculations in a timing model are inaccurate, the identified solution for a circuit design could be too pessimistic, which may result in excess area overhead from unnecessary buffering. Solutions which are overly optimistic may result in transition violations and additional computing resources needed for correcting errors in a design. By contrast, if a delay calculation is too slow, it limits the number of potential solutions that can be tried, which may result in a sub-optimal solution. The improved computing device performance during EDA operations balance these issues to provide improved computing device operation with a balance of accuracy and processing time.

Figure 1:
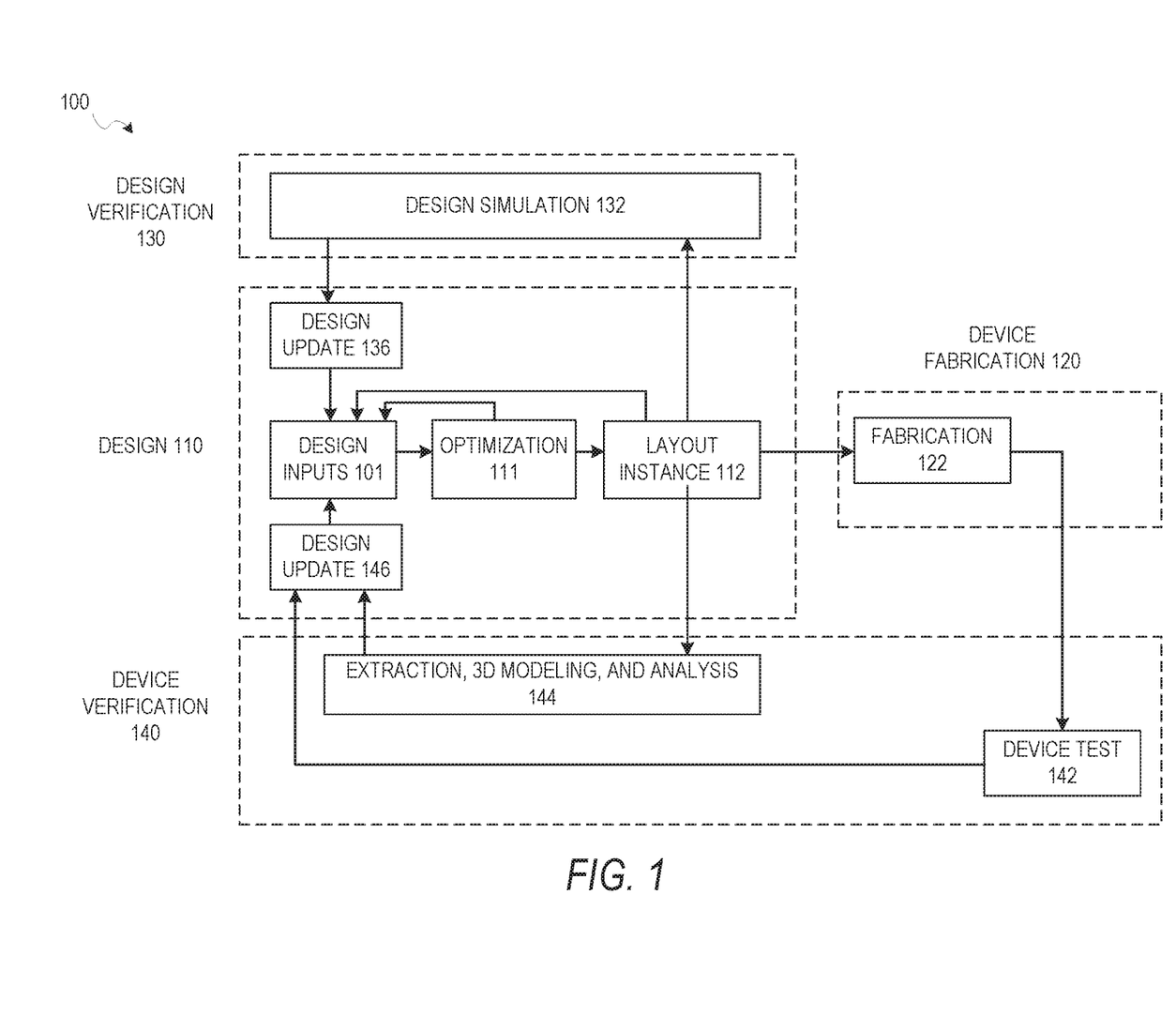
FIG. 1 is a diagram illustrating one possible design process flow for generating a circuit including embodiments to meet timing constraints according to some embodiments.

FIG. 1 is a diagram illustrating one possible design process flow which includes elements for device simulation which may use improved timing models with approximated waveform propagation as described herein. This includes possible design process flows for timing and signal integrity analysis to generate a circuit design and an associated circuit and operations for automatically modifying such circuits to generate structures that comply with design criteria. In some embodiments, the device simulation described herein is used with intermediate revisions of a circuit design, with a full chip-level simulation used for final signoff on the circuit design. It will be apparent that other design flow operations may function using the timing constraints and optimizations described herein, but design flow 100 is described here for the purposes of illustration. As illustrated, the overall design flow 100 includes a design phase 110, a device fabrication phase 120, a design verification phase 130, and a device verification phase 140. The design phase 110 involves an initial design input operation 101 where the basic elements and functionality of a device are determined, as well as revisions based on various analyses and optimization of a circuit design. This design input operation 101 is where initial layouts for a clock tree structure and sinks are generated, before adjustments are made to ensure that timing requirements for each sink are met. The initial strategy, tactics, and context for the device to be created are also generated in the design input operation 101, depending on the particular design algorithm to be used.

In some embodiments, following an initial selection of design values in design input operation 101, a routing tree may be generated, in accordance with various embodiments described herein, during optimization operation 111 or layout instance 112, along with any other automated design processes. The various routings and timing criteria may be analyzed using a timing model with an approximated waveform propagation in accordance with embodiments described herein in order to verify and improve circuit designs. While design flow 100 shows such optimization occurring prior to layout instance 112, updates to a circuit design may be performed at any time to improve expected operation of a circuit design. For example, in various embodiments, constraints for blocks in a circuit design may be generated prior to routing of connections in a circuit design, after routing, during register transfer level (RTL) operations, or as part of a final signoff optimization or verification prior to a device fabrication operation 122. Certain embodiments of operations described herein for generating or updating a routing tree structure may therefore involve iterations of design input operation 101, optimization operation 111, and layout instance 112 generation. In other systems, other design processes may be used.

After design inputs are used in design input operation 101 to generate a circuit layout, and any optimization operations 111 are performed, a layout is generated in layout instance 112. The layout describes the physical layout dimensions of the device that match the design inputs. This layout may then be used in a device fabrication operation 122 to generate a device, or additional testing and design updates may be performed using designer inputs or automated updates based on the design simulation 132 operations or extraction, 3D (three-dimensional) modeling, and analysis 144 operations. Once the device is generated, the device can be tested as part of device test 142 operations, and layout modifications generated based on actual device performance.

Design updates 136 from design simulation 132, design updates 146 from device test 142 or extraction, 3D modeling, and analysis 144 operations, or direct design input operation 101 may occur after an initial layout instance 112 is generated. In various embodiments, whenever design inputs are used to update or change an aspect of a circuit design, a timing analysis and optimization operation 111 may be performed.

Figure 2:
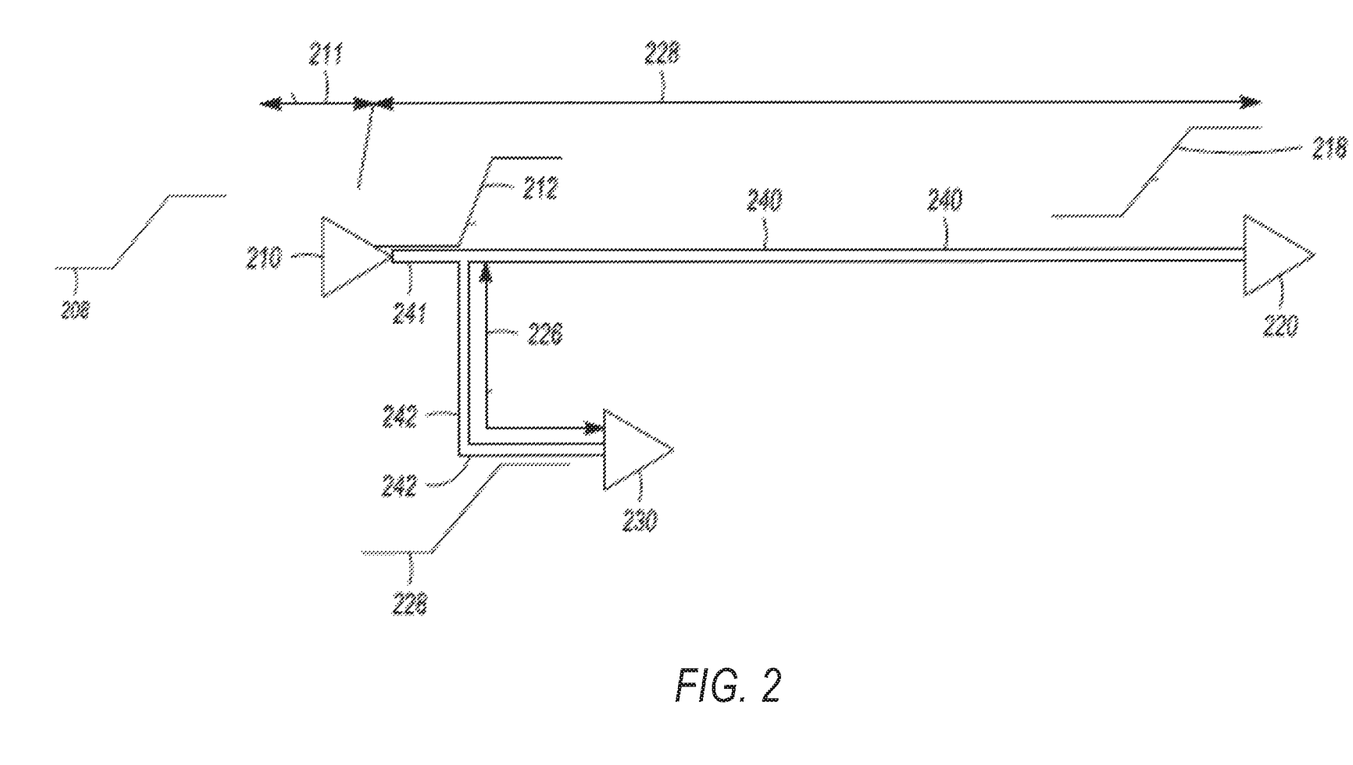
FIG. 2 illustrates a simplified example of a circuit design to be modeled by a timing model with an approximated waveform propagation in accordance with embodiments described herein.

FIG. 2 illustrates a simplified example of a circuit design 200 to be modeled by a timing model with an approximated waveform propagation in accordance with embodiments described herein. Circuit design 200 includes circuit elements 210, 220, and 230, as well as routing wire(s) 240-242 A timing model analyzing the propagation of a waveform through such a circuit will include a slew in 208 identifying a basic aspect of the input signal to circuit element 210. The circuit model will then include a delay 211 associated with circuit element 210, slew out 212 value for the output signal from circuit element 210, wire delays 226 and 228 from circuit element 210 to circuit elements 230 and 220, respectively. The circuit model will also include slew input 228 to circuit element 230 and slew input 218 to circuit element 220. If a simple slew model accurately represents a signal, then known wire delay models may provide a reasonably accurate description of the actual wire delay. For skewed waveforms (e.g. asymmetric waveforms or waveforms with a non-linear slew), simple wire delay models are not accurate. In particular, certain embodiments rely on an analytical Elmore model of wire delay as an upper bound to wire delay, but such an assumption does not hold for skewed waveforms. Embodiments described herein provide improved accuracy by not relying on such an incorrect upper bound assumption, and by capturing non-linear aspects of a circuit with greater accuracy than previous methods.

Figure 3:
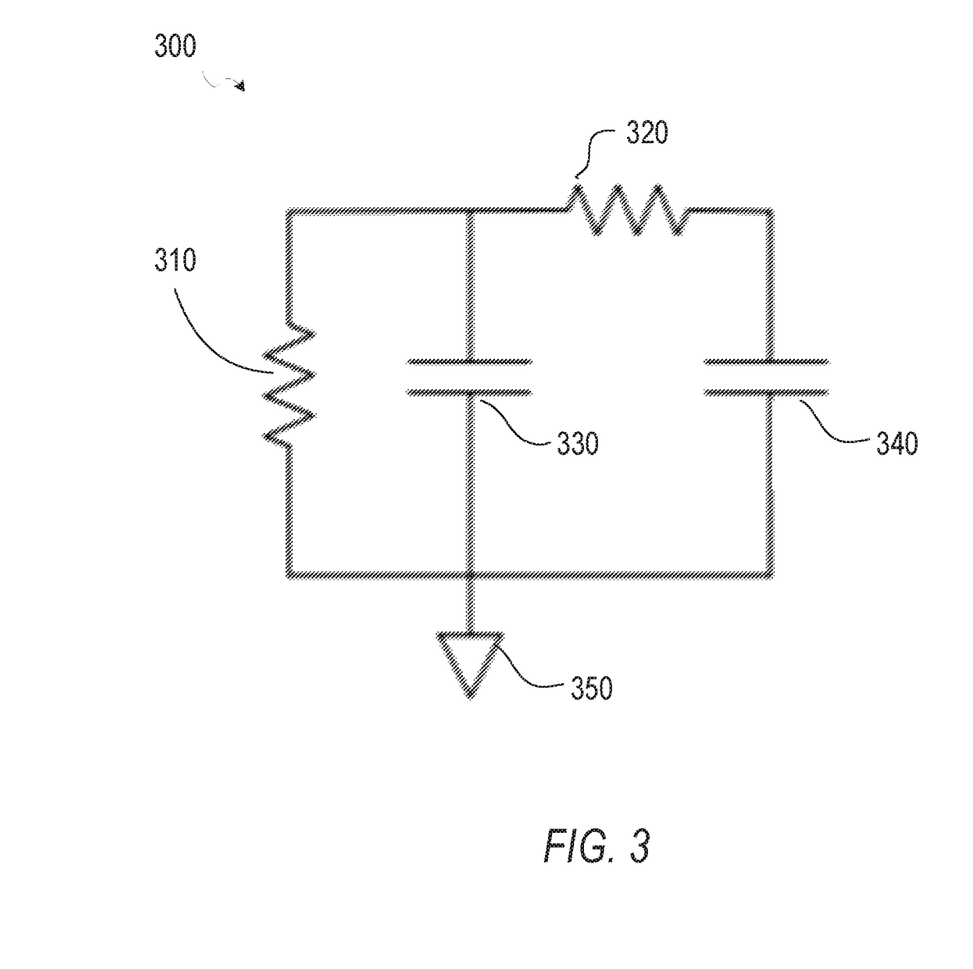
FIG. 3 illustrates aspects of a timing model for generating an approximated waveform in accordance with embodiments described herein.

FIG. 3 illustrates a model 300 of an effective capacitance Ceff for gate output waveform modeling in a circuit design which may be used with a timing model for an approximated waveform propagation in accordance with embodiments described herein. Model 300 includes ground 350, resistance 310, resistance 320, capacitance 330, and capacitance 340. For the discussion below in accordance with the described model, the resistance of resistor 310 is R, the resistance of resistor 320 is R/β, the capacitance of capacitor 330 is αC and the capacitance of capacitor 340 is (1−α)C.

A standard model for the output waveform v of such a model 300, assuming a step input, is given by:

$$v = e^{-t/\tau_1}\left[-\frac{1-\alpha-\beta}{\varsigma}\sinh(t/\tau_2) + \cosh(t/\tau_2)\right] \quad (1)$$

where:

$$\tau_1 = \frac{2\alpha(1-\alpha)}{1-\alpha+\beta}\tau \quad (2)$$

$$\tau_2 = \frac{2\alpha(1-\alpha)}{\varsigma}\tau \quad (3)$$

and $$\tau = RC \quad (4)$$

$$\varsigma = \sqrt{(1-\alpha+\beta)^2 - 4\alpha\beta(1-\alpha)}$$

This can be rewritten as:

$$v_i^w(t) = a \cdot e^{-\frac{t}{b}} + (1-a) \cdot e^{-\frac{t}{c}} \quad (5)$$

where:

$$a = \frac{1}{2}\cdot\left(1 - \frac{1-\alpha+\beta}{\zeta}\right) \quad (6)$$

$$b = \frac{\tau_1 \cdot \tau_2}{\tau_2 + \tau_1} \quad (7)$$

and $$c = \frac{\tau_1 \cdot \tau_2}{\tau_2 - \tau_1} \quad (8)$$

Embodiments described herein use such a form to create a model of an output waveform given by:

$$v_i^g(t) * v_i^w(t) = v_i^{new\_w}(t) \quad (9)$$

where $v_i^g(t)$ is a given input waveform (e.g. a slew in value). With such an input slew, the system can map to a non-linear equation which forms a sum of N exponents. Treating the gate input waveform as one exponential, a new gate output waveform may be given as:

$$v_i^{new\_w}(t) = a \cdot e^{-\frac{t}{d}} + b \cdot e^{-t \cdot f} + c \cdot e^{-t \cdot g} \quad (10)$$

where $$d = \frac{t_{slew}^g}{\ln\left(\frac{1+x}{1-x}\right)}, \quad (11)$$

$$\eta = 1 - \alpha + \beta \quad (12)$$

$$f = \frac{\eta - \sqrt{\eta^2 - 4\alpha\beta \cdot (1-\alpha)}}{2\alpha \cdot \tau \cdot (1-\alpha)} \quad (13)$$

$$g = \frac{\eta + \sqrt{\eta^2 - 4\alpha\beta \cdot (1-\alpha)}}{2\alpha \cdot \tau \cdot (1-\alpha)} \quad (14)$$

$$p1 = \frac{\beta - \tau \cdot \frac{1-\alpha}{d}}{\left(f - \frac{1}{d}\right) \cdot \left(g - \frac{1}{d}\right)} \quad (15)$$

$$p2 = \frac{\beta - f \cdot \tau \cdot (1-\alpha)}{\left(f - \frac{1}{d}\right) \cdot (f - g)} \quad (16)$$

$$p3 = \frac{\beta - g \cdot \tau \cdot (1-\alpha)}{\left(g - \frac{1}{d}\right) \cdot (g - f)} \quad (17)$$

$$n = \alpha \cdot \tau^2 \cdot (1-\alpha) \quad (18)$$

$$a = \frac{p1}{n} \quad (19)$$

$$b = \frac{p2}{f \cdot d \cdot n} \quad (20)$$

and $$c = \frac{p3}{g \cdot d \cdot n} \quad (21)$$

and where x is the difference between the 90% slew rate and the 10% slew rate.

The gate input waveform above may then be used with an approximated transfer function h(t) of an interconnect to generate an output waveform. For a simple one-pole approximation of a transfer function of an interconnect:

$$h_1(t) = -\frac{1}{m_1} e^{\frac{t}{m_1}} \quad (22)$$

may be used. For a two pole equation with moment matching:

$$h_2(t) = k_1 \cdot e^{t p_1} + k_2 \cdot e^{t p_2} \quad (23)$$

is used and the following matrix is solved to find b1 and b2:

$$\begin{bmatrix} 1 & m_1 \\ m_1 & m_2 \end{bmatrix} \begin{bmatrix} b_2 \\ b_1 \end{bmatrix} = -\begin{bmatrix} m_2 \\ m_3 \end{bmatrix} \quad (25)$$

p1 and p2 are then found from $$b_2 \cdot p^2 + b_1 \cdot p + 1 = 0 \quad (26)$$

and then k1 and k2 are found from $$\begin{bmatrix} \frac{1}{p_1} & \frac{1}{p_2} \\ \frac{1}{p_1^2} & \frac{1}{p_2^2} \end{bmatrix} \begin{bmatrix} k_1 \\ k_2 \end{bmatrix} = \begin{bmatrix} -1 \\ -m_1 \end{bmatrix} \quad (27)$$

where m1, m2, and m2 are first, second, and third moments of the waveform.

In additional embodiments, additional approximations with N-pole variations may be used. The use of additional poles in the approximation trades additional runtime for increased accuracy. The output is thus modeled as the waveform multiplied by the associated selected N-pole transfer function to determine a final output model waveform. This waveform may then be used to calculate a delay and a slew for a circuit element (e.g. the signal corresponding to slew out 212 of FIG. 2, or such a modeled signal for any circuit element of a circuit design). The final output waveform is then given by:

$$v_o^{new\_w}(t) = v_i^{new\_w}(t) * h(t) \quad (28)$$

Figure 4:
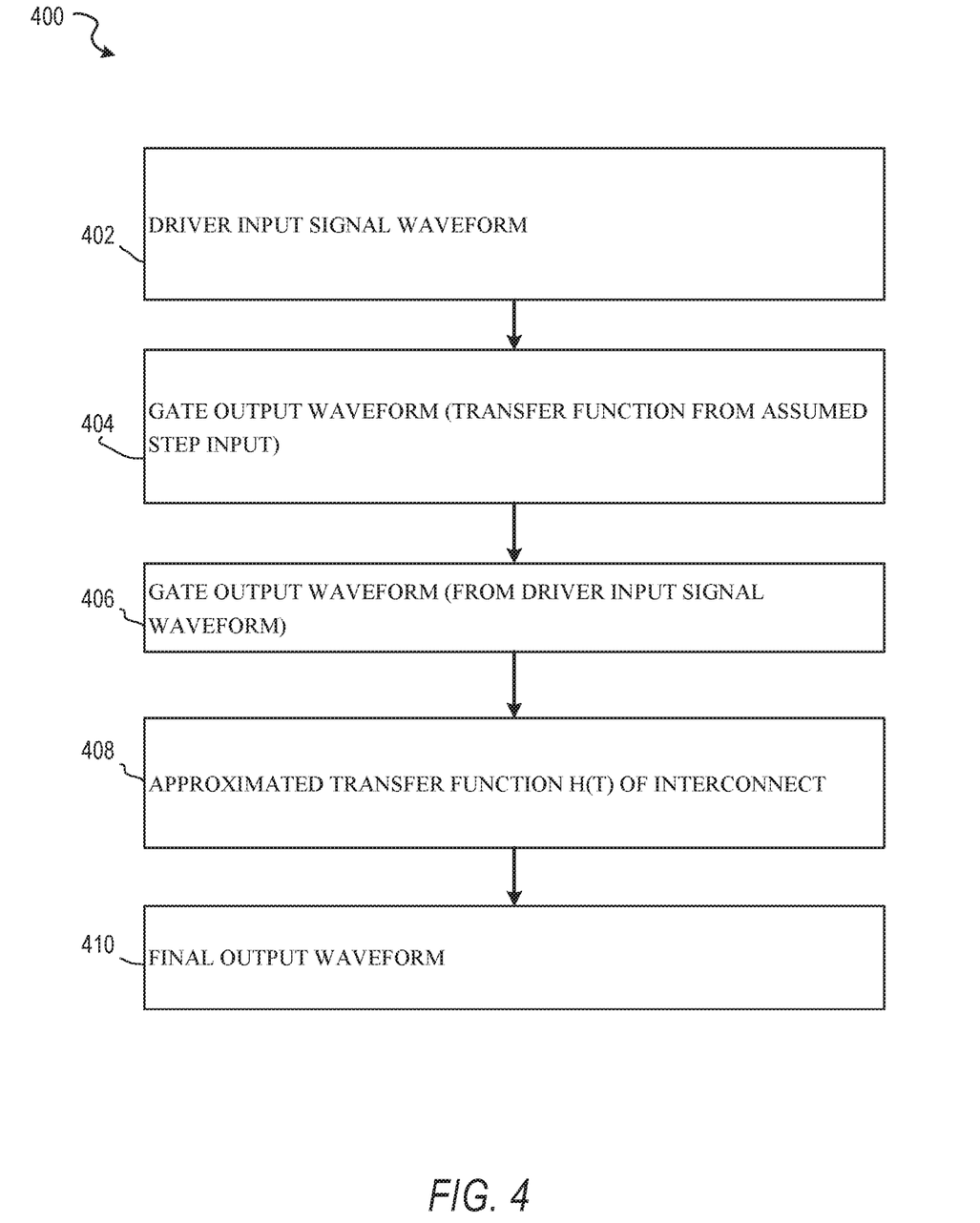
FIG. 4 is a flowchart illustrating aspects of generating a timing model in accordance with embodiments described herein.

FIG. 4 is a flowchart illustrating aspects of generating a timing model in accordance with embodiments described herein as described above. In operation 402, a driver input signal waveform is selected. This waveform may be part of the circuit operational conditions, a waveform propagated from a previous circuit elements as part of modeling in accordance with embodiments, described herein, or any similar such waveform. This input waveform is then combined with the model for the gate output of the circuit element in operation 404 to generate a gate output waveform in operation 406. This gate output waveform is then combined with the approximated transfer function of an output interconnect in operation 408 to arrive at a final output waveform in operation 410. This output waveform may then give timing values for use in various analysis of the circuit design.

The below then provides an illustrative example using specific number from an example design. In the example, an input waveform is used with a model of a circuit element to arrive at the following for a single pole model and a double pole model.

$$v_{o1}^w(t) = v_{i\_ideal}^w(t) * h_1(t) \quad (29)$$
$$= 1.52976 \cdot e^{\frac{t}{-130.408}} - 0.06728 \cdot e^{\frac{t}{-10.459}} +$$
$$0.46248 \cdot e^{\frac{t}{-87.3}}$$

$$v_{o2}^w(t) = v_{i\_ideal}^w(t) * h_2(t) \quad (30)$$
$$= 1.35169 \cdot e^{\frac{t}{-130.408}} - 0.38514 \cdot e^{\frac{t}{-10.459}} -$$
$$0.20216 \cdot e^{\frac{t}{-77.8522}} + 0.23562 \cdot e^{\frac{t}{-8.10907}}$$

This further results in the following table of data including the input model data of the circuit element and the modeled output signal which is modeled according to a timing model with an approximated waveform propagation in accordance with embodiments described herein.

TABLE 1

| | $v_{o1}^w(t)$ | $v_{o2}^w(t)$ |
|---|---|---|
| Medium | 119.141 | 119.141 |
| Slew (30-70) | 125 | 117.188 |

TABLE 1-continued

| | $v^w_{o1}(t)$ | $v^w_{o2}(t)$ |
|---|---|---|
| Slew (20-80) | 203.125 | 191.406 |
| Slew (10-90) | 320.312 | 304.688 |
| nil | −158.415 | −158.415 |
| m2 | 22483.455 | 21735.28 |
| m3 | −3084847.37 | −2902010 |
| Skewness1 (m1/sqrt(2*m2)) | −0.747 | −0.76 |
| Skewness2 (u3/(u2^(3/2))) | 1.817 | 1.888 |
| Wire slew | 250 | 234.375 |
| Wire delay | 97.656 | 97.656 |

Table 1 then provides values describing the waveform at the output of the interconnect with the circuit element based on single pole and two-pole waveforms generated in accordance with the model of embodiments described herein. These values may be used to analyze the circuit design, including propagating the waveform through a wire connection to a next circuit element, with a similar model used for the next circuit element. In this way, an entire circuit design may be modeled. The values of table 1 illustrate the balance between computing speed and accuracy. For the example illustrated in Table 1, a slow full circuit analysis gives slightly more accurate values for slew and delay, which are a slew value of 232.4 ps and a delay value of 98.8 ps. By contrast, the faster analytical analysis gives a slew value of 193 ps and a delay value of 75.6 ps. The embodiments described herein thus improves wire delay error from 23.2 ps to 1.14 ps and slew error from 39.4 ps to 1.97 ps for the two pole version when compared with the faster analytical analysis of the same circuit element. Additionally, the model described herein provides additional information about the detail of the waveform, including skewness characteristics (e.g. asymmetry), and additional details of skew at various points in the rise and fall of the waveform (e.g. slew at 10% and 90% values or any other such slew values desired by the system).

Figure 5:
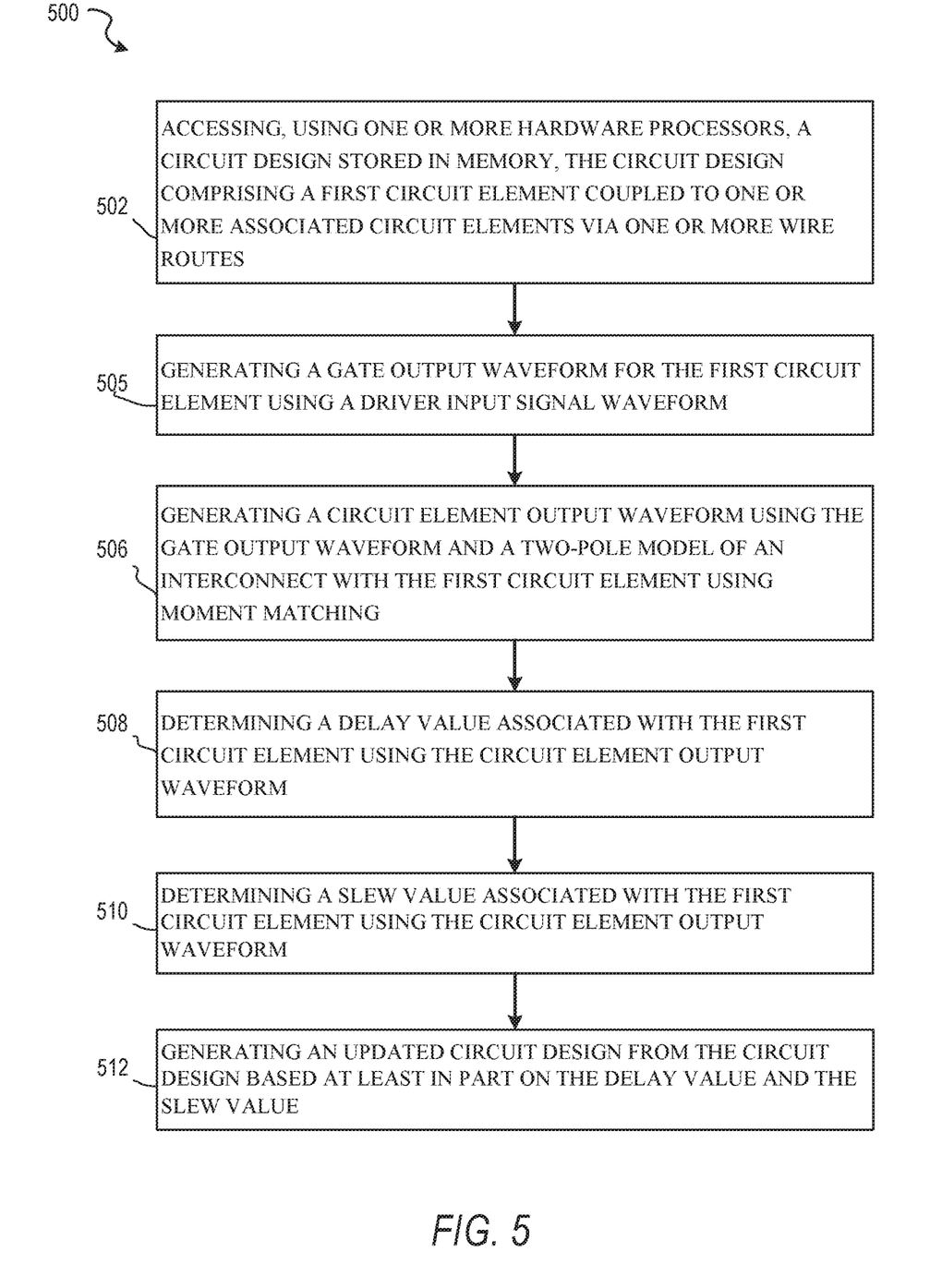
FIG. 5 illustrates an example method for generating an approximated waveform as part of timing modeling of a circuit diagram in accordance with embodiments described herein.

FIG. 5 illustrates an example method 500 for generating an approximated waveform as part of timing modeling of a circuit diagram in accordance with embodiments described herein. In some embodiments, method 500 is a method performed by an EDA computing device to generate design files for a circuit design. In some embodiments, method 500 is represented by instructions stored in a memory of an EDA computing device or in a non-transitory computer-readable medium, where the instructions cause the EDA computing device to perform method 500 when executed by one or more processors.

Method 500 begins with operation 502 involving accessing a circuit design stored in memory, the circuit design comprising a first circuit element coupled to one or more associated circuit elements via one or more wire routes. In various embodiments, the circuit design accessed may be represented by or associated with various design, library, SDC, and other files. In addition to the circuit elements and other layout details for the circuit design, criteria for input signals and details of elements associated with the modeling may be included. For example, this information may have details needed to calculate moment models of various aspects of circuit elements and interconnects in the circuit design. Operation 504 then involves generating a gate output waveform for the first circuit element using a driver input signal waveform. Such gate output waveforms may be generated, as described above, from an input waveform and a step input model of the gate. The input waveform may be an initial input provided by the design parameters, or may be a waveform propagated from previous circuit elements via wire models as described above. In operation 506, the gate output waveform is used with a two-pole model of an interconnect with moment matching to generate a circuit element output waveform. This waveform may then be used to calculate timing values in operations 508 and 510, such as delay values in operation 508 and slew values in operation 510. In various embodiments, additional timing values or various combinations of timing values may be generated. Such timing values, for example, are illustrated in table 1 as generated from the waveform of equation 30. In operation 512, these values are used for generating an updated circuit design from the circuit design based at least in part on the delay value and the slew value. The circuit element output waveform may then be propagated to additional circuit elements to expand the model to additional portions of the circuit design. Such additional information may further be used to characterize and validate updates to generate a final circuit design that meets design criteria.

In some embodiments, the operations then proceed with generating or initiating generation of a set of masks from the updated circuit design for use in generating an integrated circuit comprising the updated circuit design. The component arrangement defined and generated in the above operations may then be used to fabricate (e.g., generate) or initiate generation of an integrated circuit using the component arrangement. In various embodiments, various devices, systems, and methods are used to fabricate devices based on the updated circuit design. In some embodiments, this includes generation of masks and the use of machinery for circuit fabrication. In various implementations, files generated by embodiments described herein are used to create photolithographic masks for lithography operations used to generate circuits according to a circuit design, where a pattern defined by the masks is used in applying a thin uniform layer of viscous liquid (photo-resist) on the wafer surface. The photo-resist is hardened by baking and then selectively removed by projection of light through a reticle containing mask information. In some implementations, the files are further used for etching patterning, where unwanted material from the surface of the wafer is removed according to details described in the design files, where a pattern of the photo-resist is transferred to the wafer by means of etching agents. In some embodiments, aspects of design files generated according to the operations described herein are used for deposition operations, where films of the various materials are applied on the wafer. This may involve physical vapor deposition (PVD), chemical vapor deposition (CVD) or any such similar processes. Some embodiments may use files generated according to operations described herein for chemical mechanical polishing, where a chemical slurry with etchant agents is used to planarize to the wafer surface, for oxidation where dry oxidation or wet oxidation molecules convert silicon layers on top of the wafer to silicon dioxide, for ion implantation where dopant impurities are introduced into a semiconductor using a patterned electrical field, or for diffusion where bombardment-induced lattice defects are annealed. Thus, in various embodiments, systems and operations include not only computing devices for generating updated circuit design files, but also hardware systems for fabricating masks, controlling IC fabrication hardware, and the hardware and operations for fabricating a circuit from a circuit design (e.g., component arrangement) generated in accordance with various embodiments described herein.

Additionally, it will be apparent that any apparatus or operations described herein in accordance with various embodiments may be structured with intervening, repeated, or other elements while still remaining within the scope of the contemplated embodiments. Some embodiments may include multiple receivers, along with any other circuit elements. Some embodiments may function with described operating modes as well as other operating modes. The various embodiments described herein are thus presented as examples, and do not exhaustively describe every possible implementation in accordance with the possible embodiments.

Figure 6:
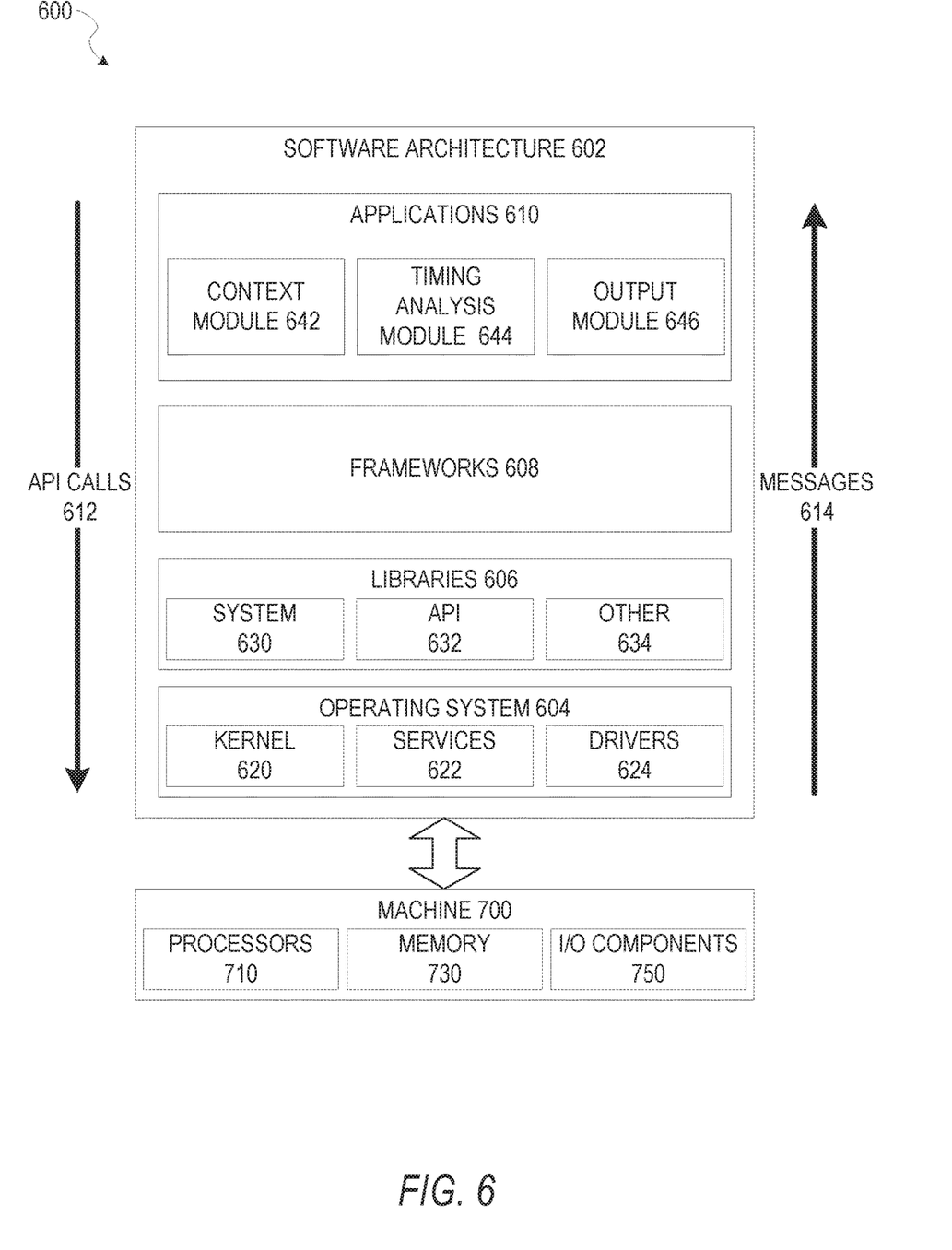
FIG. 6 is a block diagram illustrating an example of a software architecture that may be operating on an EDA computer and used with methods for timing modeling of a circuit diagram in accordance with embodiments described herein.

FIG. 6 is a block diagram 600 illustrating an example of a software architecture 602 that may be operating on an EDA computer and used with methods for modifying a balanced clock structure, according to some example embodiments. Software architecture 602 can be used as an electronic design automation computing device to implement any of the methods described above. Aspects of software architecture 602 may, in various embodiments, be used to store circuit designs and execute timing analysis or optimization in an EDA environment to generate circuit designs, with physical devices generated using these circuit designs.

Figure 7:
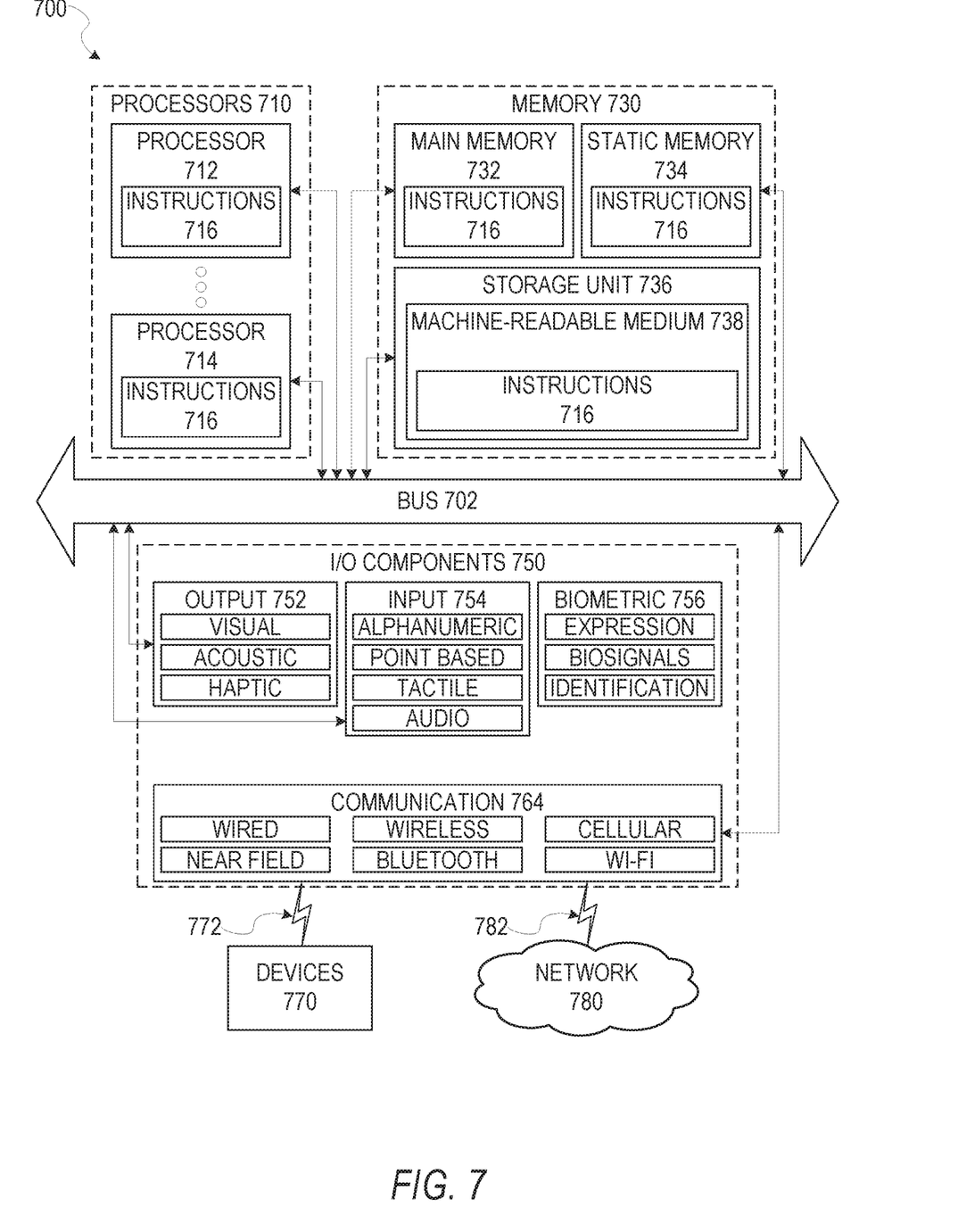
FIG. 7 is a diagrammatic representation of a machine in the form of a computer system within which a set of instructions are executed, causing the machine to perform any one or more of the methodologies discussed herein, according to some example embodiments.

FIG. 6 non-limiting example of a software architecture 602, and it will be appreciated that many other architectures can be implemented to facilitate the functionality described herein. In various embodiments, the software architecture 602 is implemented by hardware such as machine 700 that includes processors 710, memory 730, and input/output (I/O) components 750. In this example, the software architecture 602 can be conceptualized as a stack of layers where each layer may provide a particular functionality. For example, the software architecture 602 includes layers such as an operating system 604, libraries 606, frameworks 608, and applications 610. Operationally, the applications 610 invoke application programming interface (API) calls 612 through the software stack and receive messages 614 in response to the API calls 612, consistent with some embodiments. In various embodiments, any client device, server computer of a server system, or any other device described herein may operate using elements of software architecture 602. An EDA computing device described herein may additionally be implemented using aspects of the software architecture 602, with the architecture 602 adapted for operating to perform clock synthesis and modification of balanced clock structures in accordance with embodiments herein.

In one embodiment, an EDA application of applications 610 performs routing tree generation and/or adjustments, according to embodiments described herein, using various modules within software architecture 602. For example, in one embodiment, an EDA computing device similar to machine 700 includes memory 730 and one or more processors 710. The processors 710 implement a view pruning module 642 to improve routing tree synthesis in some embodiments. The processors 710 also implement additional EDA module(s) 644 to implement various circuit design operations. The design is finalized by an output module 646 if the criteria/design thresholds are met.

In some embodiments, processor-implemented output module 646 may then be used to update a display of I/O components 750 of the EDA computing device with data associated with the updated routing tree generated by the process.

In various other embodiments, rather than being implemented as modules of one or more applications 610, some or all of modules 642, 644, and 646 may be implemented using elements of libraries 606 or operating system 604.

In various implementations, the operating system 604 manages hardware resources and provides common services. The operating system 604 includes, for example, a kernel 620, services 622, and drivers 624. The kernel 620 acts as an abstraction layer between the hardware and the other software layers, consistent with some embodiments. For example, the kernel 620 provides memory management, processor management (e.g., scheduling), component management, networking, and security settings, among other functionality. The services 622 can provide other common services for the other software layers. The drivers 624 are responsible for controlling or interfacing with the underlying hardware, according to some embodiments. For instance, the drivers 624 can include display drivers, signal processing drivers to optimize modeling computation, memory drivers, serial communication drivers (e.g., Universal Serial Bus (USB) drivers), WI-FI® drivers, audio drivers, power management drivers, and so forth.

In some embodiments, the libraries 606 provide a low-level common infrastructure utilized by the applications 610. The libraries 606 can include system libraries 630 such as libraries of multi-instance blocks for use in an EDA environment or other libraries that can provide functions such as memory allocation functions, string manipulation functions, mathematic functions, and the like. In addition, the libraries 606 can include API libraries 632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 606 may also include other libraries 634.

The software frameworks 608 provide a high-level common infrastructure that can be utilized by the applications 610, according to some embodiments. For example, the software frameworks 608 provide various graphic user interface (GUI) functions, high-level resource management, high-level location services, and so forth. The software frameworks 608 can provide a broad spectrum of other APIs that can be utilized by the applications 610, some of which may be specific to a particular operating system 604 or platform. In various embodiments, the systems, methods, devices, and instructions described herein may use various files, macros, libraries, and other elements of an EDA design environment to implement analysis described herein. This includes analysis of input design files for an integrated circuit design, along with any element of view pruning, testing, and design updating that may be used as part of or along with the embodiments described herein. While netlist files, library files, SDC files and viewdefinition files are examples that may operate within a software architecture 602, it will be apparent that other files and structures may provide a similar function, in various embodiments.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) is configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an application specific integrated circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines 700 including processors 710), with these operations being accessible via a network (e.g., the Internet) and via one or more appropriate interfaces (e.g., an API). In certain embodiments, for example, a client device may relay or operate in communication with cloud computing systems, and may store media content such as images or videos generated by devices described herein in a cloud environment.

The performance of certain of the operations may be distributed among the processors, not only residing within a single machine 700, but deployed across a number of machines 700. In some example embodiments, the processors 710 or processor-implemented modules are located in a single geographic location (e.g., within a home environment, an office environment, or a server farm). In other example embodiments, the processors 710 or processor-implemented modules are distributed across a number of geographic locations.

FIG. 7 is a diagrammatic representation of the machine 700 in the form of a computer system within which a set of instructions may be executed for causing the machine 700 to perform any one or more of the methodologies discussed herein, according to an example embodiment. FIG. 7 shows components of the machine 700, which is, according to some embodiments, able to read instructions from a machine-readable medium (e.g., a machine-readable storage medium) and perform any one or more of the methodologies discussed herein. In some embodiments, the machine 700 may operate with instructions 716 (e.g., software, a program, an application, an applet, an app, or other executable code) for causing the machine 700 to perform any one or more of the methodologies discussed. In alternative embodiments, the machine 700 operates as a standalone device or can be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 can comprise, but not be limited to, a server computer, a client computer, a personal computer (PC), a tablet computer, a laptop computer, a netbook, a set-top box (STB), a personal digital assistant (PDA), a media system, a cellular telephone, a smart phone, a mobile device, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

In various embodiments, the machine 700 comprises processors 710, memory 730, and I/O components 750, which can be configured to communicate with each other via a bus 702. In an example embodiment, the processors 710 (e.g., a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), another processor, or any suitable combination thereof) include, for example, a processor 712 and a processor 714 that may execute the instructions 716. The term "processor" is intended to include multi-core processors 710 that may comprise two or more independent processors 712, 714 (also referred to as "cores") that can execute instructions 716 contemporaneously. Although FIG. 7 shows multiple processors 710, the machine 700 may include a single processor 712 with a single core, a single processor 712 with multiple cores (e.g., a multi-core processor 712), multiple processors 710 with a single core, multiple processors 710 with multiples cores, or any combination thereof.

The memory 730 comprises a main memory 732, a static memory 734, and a storage unit 736 accessible to the processors 710 via the bus 702, according to some embodiments. The storage unit 736 can include a machine-readable medium 738 on which are stored the instructions 716 embodying any one or more of the methodologies or functions described herein. The instructions 716 can also reside, completely or at least partially, within the main memory 732, within the static memory 734, within at least one of the processors 710 (e.g., within the processor's cache memory), or any suitable combination thereof, during execution thereof by the machine 700. Accordingly, in various embodiments, the main memory 732, the static memory 734, and the processors 710 are considered machine-readable media 738.

As used herein, the term "memory" refers to a machine-readable medium 738 able to store data temporarily or permanently and may be taken to include, but not be limited to, random-access memory (RAM), read-only memory (ROM), buffer memory, flash memory, and cache memory. While the machine-readable medium 738 is shown, in an example embodiment, to be a single medium, the term "machine-readable medium" should be taken to include a single medium or multiple media (e.g., a centralized or distributed database, or associated caches and servers) able to store the instructions 716. The term "machine-readable medium" shall also be taken to include any medium, or combination of multiple media, that is capable of storing instructions (e.g., instructions 716) for execution by a machine (e.g., machine 700), such that the instructions 716, when executed by one or more processors of the machine 700 (e.g., processors 710), cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 750 include a wide variety of components to receive input, provide output, produce output, transmit information, exchange information, capture measurements, and so on. In general, it will be appreciated that the I/O components 750 can include many other components that are not shown in FIG. 7. The I/O components 750 are grouped according to functionality merely for simplifying the following discussion, and the grouping is in no way limiting. In various example embodiments, the I/O components 750 include output components 752 and input components 754. The output components 752 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 754 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some embodiments, outputs from an EDA computing device may include design documents, files for additional steps in a design flow 100, or outputs for circuit fabrication. In various embodiments, outputs of a timing analysis are used to generate updates and changes to a circuit design, and after a final closure of timing with all associated timing thresholds and design requirements met, circuit design output files are used to generate masks and other physical outputs for generation of a circuit. As described herein, "requirements," "design elements," and other aspects of a circuit design refer to selectable values that are set as part of the design of a circuit. Such design requirements or elements may be adjusted by a system operator or circuit designer to suit the particular goals of a project or circuit that results from the operations described herein.

Communication can be implemented using a wide variety of technologies. The I/O components 750 may include communication components 764 operable to couple the machine 700 to a network 780 or devices 770 via a coupling 782 and a coupling 772, respectively. For example, the communication components 764 include a network interface component or another suitable device to interface with the network 780. In further examples, communication components 764 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 770 may be another machine or any of a wide variety of peripheral devices (e.g., a peripheral device coupled via a USB).

Transmission Medium

In various example embodiments, one or more portions of the network 780 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-speed Packet Access (HSPA), Worldwide Interoperability for Microwave Access (WiMAX), Long Term Evolution (LTE) standard, others defined by various standard-setting organizations, other long range protocols, or other data transfer technology.

Furthermore, the machine-readable medium 738 is non-transitory (in other words, not having any transitory signals) in that it does not embody a propagating signal. However, labeling the machine-readable medium 738 "non-transitory" should not be construed to mean that the medium 738 is incapable of movement, the medium 738 should be considered as being transportable from one physical location to another. Additionally, since the machine-readable medium 738 is tangible, the medium 738 may be considered to be a machine-readable device.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The detailed description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The description above includes systems, methods, techniques, instruction sequences, and computing machine program products that embody illustrative embodiments of the disclosure. In the description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

What is claimed is:

1. A computer-implemented method comprising:
   accessing, using one or more hardware processors, a circuit design stored in memory, the circuit design comprising a first circuit element coupled to one or more associated circuit elements via one or more wire routes;
   generating, using the one or more hardware processors, a gate output waveform for the first circuit element using a gate output waveform model, the gate output waveform model configured to generate the gate output waveform by using a driver input signal waveform and a gate input waveform as input slew value, and the driver input signal waveform comprising a waveform propagated to the first circuit element;
   generating, using the one or more hardware processors, a circuit element output waveform using the gate output waveform and an N-pole model of an interconnect with the first circuit element using moment matching;
   determining, using the one or more hardware processors, a delay value associated with the first circuit element using the circuit element output waveform;
   determining, using the one or more hardware processors, a slew value associated with the first circuit element using the circuit element output waveform; and
   generating, using the one or more hardware processors, an updated circuit design from the circuit design based at least in part on the delay value and the slew value.

2. The method of claim 1, wherein the N-pole model of the interconnect with the first circuit element using moment matching is modeled using a time based interconnect transfer function, a plurality of moment values, and a plurality of values derived from the moment values of the interconnect transfer function solvable to estimate the interconnect transfer function.

3. The method of claim 2, wherein the N-pole model of the interconnect with the first circuit element using moment matching is modeled as:

$$h_2(t) = k_1 \cdot e^{t \cdot p_1} + k_2 \cdot e^{t \cdot p_2};$$

$$\begin{bmatrix} \frac{1}{p_1} & \frac{1}{p_2} \\ \frac{1}{p_1^2} & \frac{1}{p_2^2} \end{bmatrix} \begin{bmatrix} k_1 \\ k_2 \end{bmatrix} = \begin{bmatrix} -1 \\ -m_1 \end{bmatrix};$$

$$p^2 + b_1 \cdot p + 1 = 0; \text{ and}$$

$$\begin{bmatrix} 1 & m_1 \\ m_1 & m_2 \end{bmatrix} \begin{bmatrix} b_2 \\ b_1 \end{bmatrix} = -\begin{bmatrix} m_2 \\ m_3 \end{bmatrix}$$

where
h is the time based interconnect transfer function;
t is a time variable for the waveform; and
$m_1$, $m_2$, and $m_3$ are the plurality of moment values of an interconnect transfer function and $k_1$, $k_2$, $p_1$, $p_2$, $b_1$, and $b_2$ are the plurality of values derived from the moment values of the interconnect transfer function solvable to estimate the interconnect transfer function.

4. The method of claim 3, further comprising solving for $k_1$, $k_2$, $p_1$, and $p_2$ using the one or more processors to determine values for the interconnect transfer function;
wherein the circuit element output waveform is given by the gate output waveform multiplied by the interconnect transfer function.

5. The method of claim 1, wherein generating the gate output waveform for the first circuit element using the gate output waveform model comprises generating the gate output waveform model by generating a pi model for the first circuit element for an RC circuit associated with the first circuit element.

6. The method of claim 5, further comprising computing an effective capacitance for the first circuit element based on the pi model for the first circuit element.

7. The method of claim 6, wherein the pi model and the effective capacitance for the first circuit element estimated based at least in part on the associated circuit elements and the one or more routes.

8. The method of claim 1, further comprising:
propagating, using the one or more hardware processors, the circuit element output waveform along a first route to a second circuit element to generate a second driver input signal waveform;
generating, using the one or more hardware processors, a second gate output waveform for the second circuit element using a second gate output waveform model, the second gate output waveform model configured to generate the second gate output waveform by using the second driver input signal waveform and a second gate input waveform as input slew value; and
generating, using the one or more hardware processors, a second circuit element output waveform using the second gate output waveform and a second N-pole model of a second interconnect with moment matching.

9. The method of claim 8, further comprising:
determining, using the one or more hardware processors, a second delay value associated with the second circuit element using the second circuit element output waveform;
determining, using the one or more hardware processors, a second slew value associated with the second circuit element using the second circuit element output waveform; and
generating, using the one or more hardware processors, a second updated circuit design from the circuit design based at least in part on the second delay value and the second slew value.

10. The method of claim 1, wherein the gate output waveform model generates the gate output waveform according to:

$$v_i^{new\_w}(t) = a \cdot e^{-\frac{t}{d}} + b \cdot e^{-t \cdot f} + c \cdot e^{-t \cdot g}$$

where $$d = \frac{t_{slew}^g}{ln\left(\frac{1+x}{1-x}\right)};$$

$$\eta = 1 - \alpha + \beta;$$

$$f = \frac{\eta - \sqrt{\eta^2 - 4\alpha\beta \cdot (1-\alpha)}}{2\alpha \cdot \tau \cdot (1-\alpha)};$$

$$g = \frac{\eta + \sqrt{\eta^2 - 4\alpha\beta \cdot (1-\alpha)}}{2\alpha \cdot \tau \cdot (1-\alpha)};$$

$$p1 = \frac{\beta - \tau \cdot \frac{1-\alpha}{d}}{\left(f - \frac{1}{d}\right) \cdot \left(g - \frac{1}{d}\right)};$$

$$p2 = \frac{\beta - f \cdot \tau \cdot (1-\alpha)}{\left(f - \frac{1}{d}\right) \cdot (f-g)};$$

$$p3 = \frac{\beta - g \cdot \tau \cdot (1-\alpha)}{\left(g - \frac{1}{d}\right) \cdot (g-f)};$$

$$n = \alpha \cdot \tau^2 \cdot (1-\alpha);$$

$$a = \frac{p1}{n};$$

$$b = \frac{p2}{f \cdot d \cdot n}; \text{ and}$$

$$c = \frac{p3}{g \cdot d \cdot n};$$

where $\alpha$, $\beta$, and $\tau$ are pi model values derived from resistance and capacitance values of a pi model for the first circuit element, and where x is a difference between a 90% slew rate and a 10% slew rate.

11. The method of claim 1, wherein the circuit element output waveform is configured as a polynomial based waveform.

12. The method of claim 1, wherein the circuit element output waveform is configured as an exponent based waveform.

13. The method of claim 1, further comprising storing a set of waveform values in a lookup table associated with the first circuit element, the lookup table comprising a plurality of circuit environments and associated circuit element output waveform data; and wherein generating the updated circuit design based at least in part on the delay value and the slew value comprises accessing the lookup table for waveform values associated with a first environment of the plurality of circuit environments that matches the circuit design.

14. The method of claim 1, further comprising generating a set of masks from the updated circuit design for use in generating an integrated circuit comprising the updated circuit design.

15. The method of claim 1, wherein the gate output waveform model uses the gate input waveform as input slew value by using the gate input waveform as an exponential in the gate output waveform model.

16. A device for generating an updated circuit design, the device comprising:
a memory configured to store a circuit design, the circuit design comprising a plurality of circuit elements, the plurality of circuit elements comprising at least a first circuit element coupled to one or more associated circuit elements via one or more wire routes; and
one or more hardware processors configured to perform operations comprising:
generating a gate output waveform for the first circuit element using a gate output waveform model, the gate output waveform model configured to generate the gate output waveform by using a driver input signal waveform and a gate input waveform as input slew value, and the driver input signal waveform comprising a waveform propagated to the first circuit element;
generating a circuit element output waveform using the gate output waveform and an N-pole model of an interconnect with the first circuit element using moment matching;
determining a plurality of timing values from the circuit element output waveform, the plurality of timing values comprising a delay value and a skew value; and
generating an updated circuit design from the circuit design based at least in part on the delay value and the slew value.

17. The device of claim 16, wherein the one or more hardware processors are further configured to perform operations comprising:
propagating the circuit element output waveform to the one or more associated circuit elements coupled to the first circuit element via the one or more wire routes to generate one or more propagated waveforms.

18. The device of claim 17, wherein the N-pole model of the interconnect with the first circuit element using moment matching is modeled using a time based interconnect transfer function, a plurality of moment values, and a plurality of values derived from the moment values of the interconnect transfer function solvable to estimate the interconnect transfer function; and
wherein the N-pole model of the interconnect with the first circuit element using moment matching is modeled as:

$$h_2(t) = k_1 \cdot e^{t \cdot p_1} + k_2 \cdot e^{t \cdot p_2};$$

$$\begin{bmatrix} \frac{1}{p_1} & \frac{1}{p_2} \\ \frac{1}{p_1^2} & \frac{1}{p_2^2} \end{bmatrix} \begin{bmatrix} k_1 \\ k_2 \end{bmatrix} = \begin{bmatrix} -1 \\ -m_1 \end{bmatrix};$$

$$p^2 + b_1 \cdot p + 1 = 0; \text{ and}$$

$$\begin{bmatrix} 1 & m_1 \\ m_1 & m_2 \end{bmatrix} \begin{bmatrix} b_2 \\ b_1 \end{bmatrix} = -\begin{bmatrix} m_2 \\ m_3 \end{bmatrix}$$

where
h is the time based interconnect transfer function;
t is a time variable for the waveform; and
$m_1$, $m_2$, and $m_3$ are the plurality of moment values of an interconnect transfer function and $k_1$, $k_2$, $p_1$, $p_2$, $b_1$, and $b_2$ are the plurality of values derived from the moment values of the interconnect transfer function solvable to estimate the interconnect transfer function.

19. A non-transitory computer-readable medium comprising instructions that, when executed by one or more hardware processors of an electronic design automation (EDA) computing device, cause the device to perform operations comprising:
accessing a circuit design stored in memory, the circuit design comprising a first circuit element coupled to one or more associated circuit elements via one or more wire routes;
generating a gate output waveform for the first circuit element using a gate output waveform model, the gate output waveform model configured to generate the gate output waveform by using a driver input signal waveform and a gate input waveform as input slew value, and the driver input signal waveform comprising a waveform propagated to the first circuit element;
generating a circuit element output waveform using the gate output waveform and an N-pole model of an interconnect with the first circuit element using moment matching;
determining a set of timing values from the circuit element output waveform, the set of timing values comprising one or more of a delay value and a slew value;
generating an updated circuit design from the circuit design based at least in part on the set of timing values.

20. The non-transitory medium of claim 19, wherein the gate output waveform model generates the gate output waveform according to:

$$v_i^{new\_w}(t) = a \cdot e^{-\frac{t}{d}} + b \cdot e^{-t \cdot f} + c \cdot e^{-t \cdot g}$$

where $$d = \frac{t_{slew}^g}{ln\left(\frac{1+x}{1-x}\right)};$$

$$\eta = 1 - \alpha + \beta;$$

$$f = \frac{\eta - \sqrt{\eta^2 - 4\alpha\beta \cdot (1-\alpha)}}{2\alpha \cdot \tau \cdot (1-\alpha)};$$

-continued $$g = \frac{\eta + \sqrt{\eta^2 - 4\alpha\beta \cdot (1-\alpha)}}{2\alpha \cdot \tau \cdot (1-\alpha)};$$

$$p1 = \frac{\beta - \tau \cdot \frac{1-\alpha}{d}}{\left(f - \frac{1}{d}\right) \cdot \left(g - \frac{1}{d}\right)};$$

$$p2 = \frac{\beta - f \cdot \tau \cdot (1-\alpha)}{\left(f - \frac{1}{d}\right) \cdot (f - g)};$$

$$p3 = \frac{\beta - g \cdot \tau \cdot (1-\alpha)}{\left(g - \frac{1}{d}\right) \cdot (g - f)};$$

$$n = \alpha \cdot \tau^2 \cdot (1-\alpha);$$

$$a = \frac{p1}{n};$$

$$b = \frac{p2}{f \cdot d \cdot n}; \text{ and}$$

$$c = \frac{p3}{g \cdot d \cdot n};$$

where $\alpha$, $\beta$, and $\tau$ are pi model values derived from resistance and capacitance values of a pi model for the first circuit element, and where x is a difference between selected slew rates of the waveform.

* * * * *